United States Patent
Whitney et al.

(10) Patent No.: US 9,254,838 B2
(45) Date of Patent: Feb. 9, 2016

(54) HYBRID POWERTRAIN COORDINATION DURING A DIESEL PARTICULATE FILTER REGENERATION EVENT

(75) Inventors: Christopher E. Whitney, Commerce, MI (US); Luca Scavone, Moncalieri (IT); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 13/616,857

(22) Filed: Sep. 14, 2012

(65) Prior Publication Data

US 2013/0325227 A1    Dec. 5, 2013

Related U.S. Application Data

(60) Provisional application No. 61/655,726, filed on Jun. 5, 2012.

(51) Int. Cl.
*B60W 20/00* (2006.01)
*B60W 10/06* (2006.01)
(Continued)

(52) U.S. Cl.
CPC ........... *B60W 20/1082* (2013.01); *B60W 10/06* (2013.01); *B60W 10/08* (2013.01); *B60W 10/115* (2013.01); *B60W 10/26* (2013.01); *B60W 20/1088* (2013.01); *B60W 2510/105* (2013.01);
(Continued)

(58) Field of Classification Search
CPC ..... B60W 10/06; B60W 20/00; B60W 10/08; B60W 10/10; B60W 2510/068; B60W 10/184; B60W 2710/0616; B60W 30/1882; B60K 6/54; B60K 6/24; B60K 6/28; B60K 2006/4825; B60K 6/46; B60K 6/52; B60K 6/543; Y02T 10/121; Y02T 10/20
USPC ........... 701/22, 102, 19, 104, 110, 53, 54, 70; 60/286, 295, 274, 285, 297, 301, 311; 180/305, 369, 65.1, 65.23, 65.7
See application file for complete search history.

(56) References Cited

U.S. PATENT DOCUMENTS 6,568,173 B1 *   5/2003   Kolmanovsky et al. ........ 60/280
6,916,450 B2 *   7/2005   Akama et al. ................. 422/180
(Continued)

FOREIGN PATENT DOCUMENTS

| CN | 101061011 A | 10/2007 |
| CN | 101408121 A | 4/2009 |
| JP | 2008163884 A | 7/2008 |

*Primary Examiner* — Truc M Do
(74) *Attorney, Agent, or Firm* — Quinn Law Group, PLLC

(57) ABSTRACT

A hybrid diesel-electric powertrain includes an electric motor in electrical communication with a traction battery, a diesel engine in power-flow communication with the electric motor and with an automatic transmission, and a controller. The diesel engine and electric motor are configured to provide a combined torque to the automatic transmission. The powertrain further includes an exhaust aftertreatment device in fluid communication with the diesel engine. The controller is configured to: receive a regeneration request from the exhaust aftertreatment device; determine if a state-of-charge of the fraction battery is within a predetermined range of a target value; initiate a regeneration event if the state-of-charge of the traction battery is within the predetermined range of the target value; receive an immediate torque request from the automatic transmission; and provide a torque command to the electric motor in response to the immediate torque request.

18 Claims, 2 Drawing Sheets

(51) Int. Cl.
  *B60W 10/08* (2006.01)
  *B60W 10/26* (2006.01)
  *B60W 10/115* (2012.01)

(52) U.S. Cl.
  CPC ...... *B60W 2510/244* (2013.01); *B60W 2530/12* (2013.01); *B60W 2540/10* (2013.01); *B60W 2710/0666* (2013.01); *B60W 2710/083* (2013.01); *B60W 2710/1005* (2013.01); *B60Y 2300/476* (2013.01); *B60Y 2400/432* (2013.01); *Y02T 10/54* (2013.01); *Y02T 10/6286* (2013.01)

(56) References Cited

U.S. PATENT DOCUMENTS

| | | | |
|---|---|---|---|
| 7,055,311 B2 * | 6/2006 | Beutel et al. | 60/285 |
| 7,426,910 B2 * | 9/2008 | Elwart | 123/46 E |
| 7,886,524 B2 * | 2/2011 | van Nieuwstadt et al. | 60/285 |
| 8,277,363 B2 * | 10/2012 | Lahti et al. | 477/98 |
| 8,306,722 B2 * | 11/2012 | Whitney et al. | 701/110 |
| 8,438,840 B2 * | 5/2013 | Bidner et al. | 60/295 |
| 8,438,841 B2 * | 5/2013 | Bidner et al. | 60/295 |
| 2002/0053202 A1 * | 5/2002 | Akama et al. | 60/297 |
| 2003/0046927 A1 * | 3/2003 | Nagai et al. | 60/285 |
| 2003/0121249 A1 * | 7/2003 | Foster et al. | 60/285 |
| 2003/0160455 A1 * | 8/2003 | Hu et al. | 290/40 C |
| 2005/0251299 A1 * | 11/2005 | Donnelly et al. | 701/19 |
| 2005/0262827 A1 * | 12/2005 | Ichimoto et al. | 60/277 |
| 2006/0086546 A1 * | 4/2006 | Hu et al. | 180/65.2 |
| 2006/0266017 A1 * | 11/2006 | Kresse | 60/274 |
| 2007/0089401 A1 * | 4/2007 | Nieuwstadt et al. | 60/285 |
| 2007/0181354 A1 * | 8/2007 | Andri | 180/65.2 |
| 2007/0204594 A1 * | 9/2007 | Ishii | 60/274 |
| 2007/0204601 A1 * | 9/2007 | Ishii et al. | 60/295 |
| 2007/0205029 A1 * | 9/2007 | Leone et al. | 180/65.2 |
| 2007/0220864 A1 * | 9/2007 | Haugen | 60/286 |
| 2007/0240922 A1 * | 10/2007 | Kikuchi | 180/65.4 |
| 2007/0297961 A1 * | 12/2007 | Silver et al. | 423/212 |
| 2008/0098972 A1 * | 5/2008 | Elwart | 123/142.5 E |
| 2008/0105477 A1 * | 5/2008 | Abe | 180/65.2 |
| 2009/0025371 A1 * | 1/2009 | Hermansson et al. | 60/286 |
| 2009/0105896 A1 * | 4/2009 | Tamai | B60K 6/365 701/22 |
| 2009/0118091 A1 * | 5/2009 | Lahti et al. | 477/100 |
| 2009/0118884 A1 * | 5/2009 | Heap | B60K 6/365 701/22 |
| 2010/0043404 A1 * | 2/2010 | Hebbale et al. | 60/286 |
| 2011/0005503 A1 * | 1/2011 | Harden et al. | 123/568.12 |
| 2011/0072800 A1 * | 3/2011 | Bidner et al. | 60/286 |
| 2011/0072802 A1 * | 3/2011 | Bidner et al. | 60/287 |
| 2011/0195817 A1 * | 8/2011 | Whitney et al. | 477/121 |
| 2011/0257821 A1 * | 10/2011 | Beaucaire et al. | 701/22 |
| 2012/0036850 A1 * | 2/2012 | Ernst et al. | 60/615 |
| 2012/0173062 A1 * | 7/2012 | Madurai Kumar et al. | 701/22 |
| 2013/0047607 A1 * | 2/2013 | Petrovic et al. | 60/605.2 |

* cited by examiner

US 9,254,838 B2

HYBRID POWERTRAIN COORDINATION DURING A DIESEL PARTICULATE FILTER REGENERATION EVENT

CROSS REFERENCE TO RELATED APPLICATIONS

This application claims the benefit of U.S. Provisional Application No. 61/655,726, filed Jun. 5, 2012, which is hereby incorporated by reference in its entirety.

TECHNICAL FIELD

The present invention relates to hybrid diesel powertrain control.

BACKGROUND

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston-type internal combustion engine (ICE). The internal combustion engine converts chemical energy stored in fuel (gasoline, diesel, bio fuels, natural gas, or other fuels) into kinetic energy through combustion of the fuel mixed with air.

Hybrid vehicles utilize multiple, alternative power sources to propel the vehicle, minimizing reliance on the engine for power. A hybrid electric vehicle (HEV), for example, incorporates both electrical energy and chemical energy, and converts the same into mechanical power to propel the vehicle and power the vehicle systems. The HEV generally employs one or more electric machines (motor/generators) that operate individually or in concert with the internal combustion engine to propel the vehicle. The electric machines convert kinetic energy into electrical energy which may be stored in an energy storage device. The electrical energy from the energy storage device may also be converted back into kinetic energy for propulsion of the vehicle.

SUMMARY

A hybrid diesel-electric powertrain includes an electric motor in electrical communication with a traction battery, a diesel engine in power-flow communication with the electric motor and with an automatic transmission, and a controller. The diesel engine and electric motor are configured to provide a combined torque to the automatic transmission. The powertrain further includes an exhaust aftertreatment device in fluid communication with the diesel engine.

During operation, the controller is configured to: receive a regeneration request from the exhaust aftertreatment device; determine if a state-of-charge of the traction battery is within a predetermined range of a target value; initiate a regeneration event if the state-of-charge of the traction battery is within the predetermined range of the target value; receive an immediate torque request from the automatic transmission; and provide a torque command to the electric motor in response to the immediate torque request.

The controller is configured to initiate the regeneration event by increasing a ratio of fuel-to-air provided to the diesel engine to a level greater than a stoichiometric balance. The exhaust aftertreatment device may be configured to provide a regeneration request to the controller when the pressure drop across the aftertreatment device exceeds a threshold pressure drop The immediate torque request may be provided by the automatic transmission in response to a request for an automatic gear change. As such, the immediate torque request may be a negative torque request sufficient to decrease the combined torque transmitted through an automatic transmission toward zero. The negative torque command provided to the electric motor may then be configured to operate the electric motor as a generator to produce a negative output torque from the motor.

The controller may be configured to draw down the state-of-charge of the traction battery if the state-of-charge is above the predetermined range. Similarly, the controller may be configured to regenerate the state-of-charge of the fraction battery if the state-of-charge is below the predetermined range.

Similarly, a method of controlling a vehicle powertrain during a regeneration event includes: receiving a regeneration request; determining if a state-of-charge of a fraction battery is within a predetermined range of a target value; initiating the regeneration event if the state-of-charge of the traction battery is within the predetermined range of the target value; receiving an immediate torque request; and operating the electric motor in response to the immediate torque request.

The above features and advantages and other features and advantages of the present invention are readily apparent from the following detailed description of the best modes for carrying out the invention when taken in connection with the accompanying drawings.

DETAILED DESCRIPTION

Figure 1:
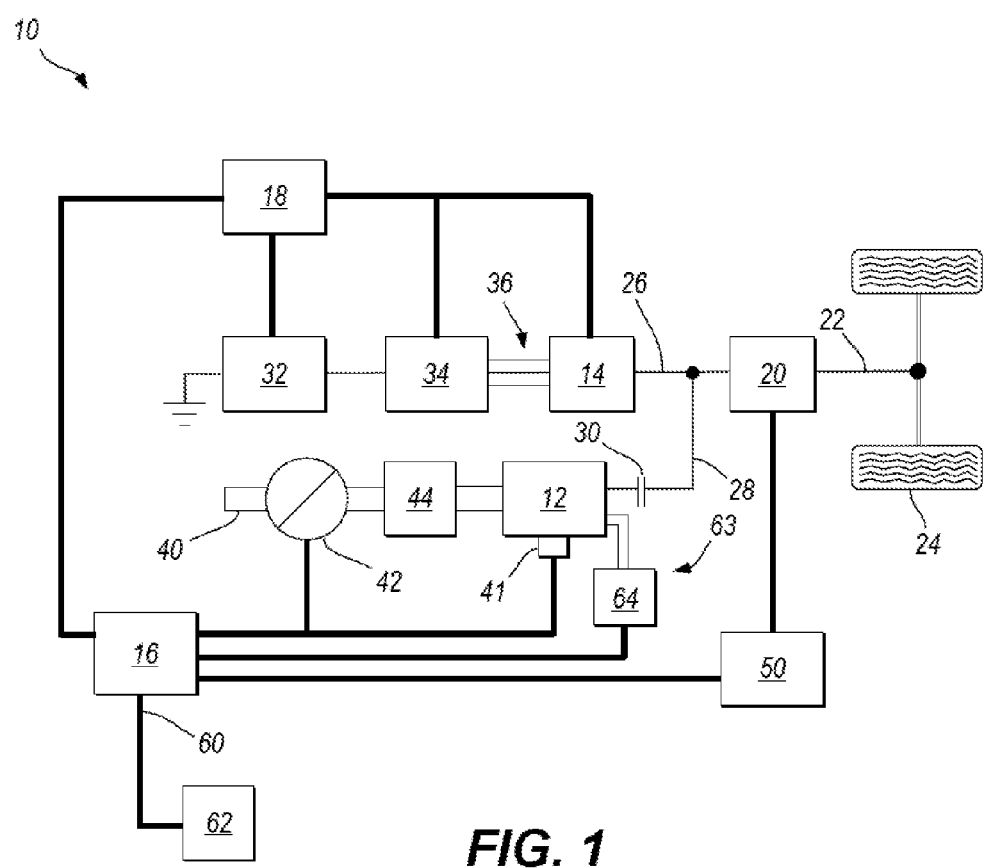
FIG. 1 is a schematic diagram of a hybrid diesel-electric powertrain in communication with an engine control module, transmission control module, and hybrid control module.

Referring to the drawings, wherein like reference numerals are used to identify like or identical components in the various views, FIG. 1 schematically illustrates a hybrid powertrain 10 for a hybrid diesel-electric vehicle. The hybrid powertrain 10 may include an internal combustion engine 12 in mechanical communication with an electric traction motor 14 (electric motor 14). The internal combustion engine 12 may generally be controlled by an engine control module 16 (ECM 16), while the electric motor 14 may generally be controlled by a hybrid control module 18 (HCM 18). While FIG. 1 generally illustrates one particular configuration of a hybrid diesel-electric vehicle, other arrangements may be similarly applicable to the presently described technology. Likewise, additional electric motors may be included in various arrangements within the powertrain 10 to serve as the primary movers for the hybrid vehicle. As such, the engine 12 and electric motor(s) 14 may be in power-flow communication with each other and with a transmission 20 to ultimately power a drive shaft 22 and one or more drive wheels 24.

The electric motor 14 may provide one source of torque via a motor output shaft 26. Similarly, the engine 12 may generate torque via a crankshaft 28, which may be selectively coupled with the motor output shaft 26 through a clutch 30 and/or one or more planetary gear sets (not shown). Torque from the crankshaft 28 can be used to directly propel the vehicle 10, and/or to drive the electric motor 14 as a generator to recharge a traction battery 32.

The electric motor 14 may be embodied as a multi-phase permanent magnet/AC induction machine rated for approximately 60 volts to approximately 300 volts or more depending on the vehicle design. The electric motor 14 may be electrically connected to the traction battery 32 via a power inverter module (PIM) 34 and a high-voltage bus bar 36. The PIM 34 may generally be configured for converting DC power to AC power and vice versa as needed. The battery 32 may be selectively recharged using torque from the electric motor 14 when that motor 14 is actively operating as a generator, e.g., by capturing energy during a regenerative braking event or when being driven by the engine 12. As may be appreciated, the electric motor 14 may be an electric motor, an electric generator, a motor/generator, or any combination thereof. In some embodiments, such as plug-in HEV (PHEV), the battery 32 may also be recharged via an off-board power supply (not shown) when the vehicle 10 is idle.

The engine 12 may be in fluid communication with an air intake 40 and one or more fuel injectors 41. The air intake 40 may be configured to provide a supply of fresh air to the engine, where the air may mix with the fuel from the fuel injector 41. A variable throttle 42 may controllably modulate the flow of air from the intake 40 to the engine 12, under the direction of the ECM 16. Likewise, the ECM 16 may control the flow of fuel into the engine 12 via the one or more fuel injectors 41. In one configuration, an intake manifold 44 may be disposed between the throttle 42 and the engine 12 to allow the intake air to evenly flow into the engine 12.

During vehicle propulsion, the ECM 16 may vary the torque produced engine 12 by selectively modifying the behavior of "torque actuators." In general, a torque actuator is a controllable aspect of the engine that may selectively increase or decrease the torque output at the crankshaft 28. Torque actuators may generally fall into two categories: slow-response actuators and fast-response actuators. Fast-response actuators can effect a near-immediate (e.g., 20-50 ms) change in engine output torque, such as spraying more or less fuel into a cylinder, retarding a spark (in a gasoline engine), changing variable cam phasers, and/or increasing exhaust gas recirculation (EGR) to dilute the air/fuel mixture. Conversely, slow-response actuators may take many revolutions of the engine (e.g., 100-500 ms) to effect a torque change, and may often involve spooling the engine from a lower speed to a higher speed. Slow-response actuators may include, for example, controlling the throttle 42 to increase/decrease the amount of air entering the engine 12, and/or changing boost-pressure via one or more compressors (e.g., turbochargers (not shown)).

In very general terms, and with many other variables fixed or ignored, as more oxygen-rich air and fuel are provided into the engine 12, more torque will be produced. By opening the throttle to its widest and least restrictive position, the engine 12 may operate at its highest long-term torque output (i.e., its maximum capacity).

The ECM 16 may use inputs from various sensors (e.g., intake sensors, manifold air pressure sensors, fuel sensors and/or air mass sensors) to estimate or calculate the torque capacity and capability of the engine 12. The ECM 16 may send the determined torque capacity, along with other measured or determined information, to the HCM 18, which may determine the most efficient manner to utilize the torque production capacity of the engine 12 and motor 14. In one embodiment, the HCM 18 may employ a torque optimization routine to arbitrate various torque requests and operate the engine at its most efficient state as often as possible. The HCM 18 may then determine the amount of torque the engine 12 should produce/supply and how much torque (positive or negative) the electric motor 14 should supply. The engine torque request may then be provided back to the ECM 16 to intelligently control the various engine torque actuators, while the motor torque request may be provided to the PIM 34 to control the motor 14. Generally, more accurate estimates of the torque capacity of the engine 12 allow more accurate optimization of the hybrid powertrain 10 by the HCM 18.

In addition to the ECM 16 and HCM 18, the powertrain 10 may further include a transmission control module 50 (TCM 50). The TCM 50 may be in communication with each of the ECM 16 and HCM 18, and may aid in coordinating gear changes within the transmission 20 (which may be an automatic transmission 20). For example, during a gear change, the net torque transmitted through the transmission 20 may desirably be at some predetermined value that is lower than the driver-requested torque. In this manner, the ECM 16 and/or HCM 18 may momentarily override any driver-requested torque commands to facilitate the gear-change in cooperation with the TCM 50.

In one configuration, the engine 12 may be a diesel engine 12 and may operate in response to a driver torque request 60 provided via an accelerator pedal 62. The driver torque request 60 may be received by the ECM 16 and filtered/smoothed to remove any high-frequency noise. The smoothed request may then be used to control the torque output of the engine 12 by varying the amount of fuel supplied to the engine 12 via the fuel injectors 41. In response to the fuel command, the ECM 16 may control the amount of air flow through the throttle 44 to maintain a desired fuel/air mixture, while also modulating any exhaust gas recirculation, to control the combustion. While fuel supply is generally a fast-response torque actuator, to maintain a generally efficient burn, the fuel response may be artificially limited during normal acceleration as a function of the throttle/air flow dynamics. This manner of powertrain control is typically unlike a spark-ignited gasoline engine, where the driver torque request 60 is used to manipulate the throttle 44, and the fuel is a dependant variable based on available airflow.

The diesel engine may further be in fluid communication with an exhaust aftertreatment device 63 that may include a particulate filter 64 and/or lean NOx trap. The particulate filter 64 and/or lean NOx trap may be operative to filter particulate matter, i.e., soot, and/or catalyze NOx from the exhaust gas of the engine 12. The particulate filter 64 may include one or more substrates that define a plurality of apertures, through which the exhaust gas must flow. During operation, particulate matter from combustion may collect within the particulate filter 64 as the exhaust gas passes through the filter 64. The particulate filter 64 and/or lean NOx trap may need to be occasionally regenerated to remove the collected particulate matter. Regeneration of the particulate filter 64 and/or lean NOx trap (i.e., a "regeneration event") may include, for example, heating the filter 64 to a high temperature such that any collected particulate matter may burn off into carbon dioxide, and may be dissipated by the flowing exhaust. Other aftertreatment devices may include Lean NOx Trap (LNT), with the regeneration including similar means of removing buildup from the trap.

In one configuration, the regeneration event may occur at the request of the ECM 16, which may be in electrical communication with the exhaust aftertreatment device 63. To accomplish the regeneration, the ECM 16 may control the ratio of fuel to air supplied to the engine 12 such that it is slightly rich (greater) of a stoichiometric balance (i.e., more fuel than ideal). When this occurs, the combustion may burn hotter than normal, however, the ECM 16 may lose the ability to modify the air/fuel ratio should an immediate torque request be received. As used herein, an immediate torque request is a torque request that is achieved by the ECM 16 by manipulating various fast-response torque actuators over a short time frame (20-50 ms).

To avoid the constrained regeneration event from interfering with typical driving, the HCM 18 may modulate the behavior of the electric motor 14 to supplement the immediate engine response capabilities that may be suspended during a regeneration event. For example, in an automatic-transmission context, when an upshift is performed it is typical for the TCM 50 to request an immediate torque decrease to assist with lowering the engine speed to the next gear ratio. If the TCM 50 were to request a gear change during a fuel-rich regeneration event, the HCM 18 may operate the electric motor 14 as a generator (i.e., resulting in a negative torque) to provide a momentary and instantaneous torque reduction at the transmission 20.

Figure 2:
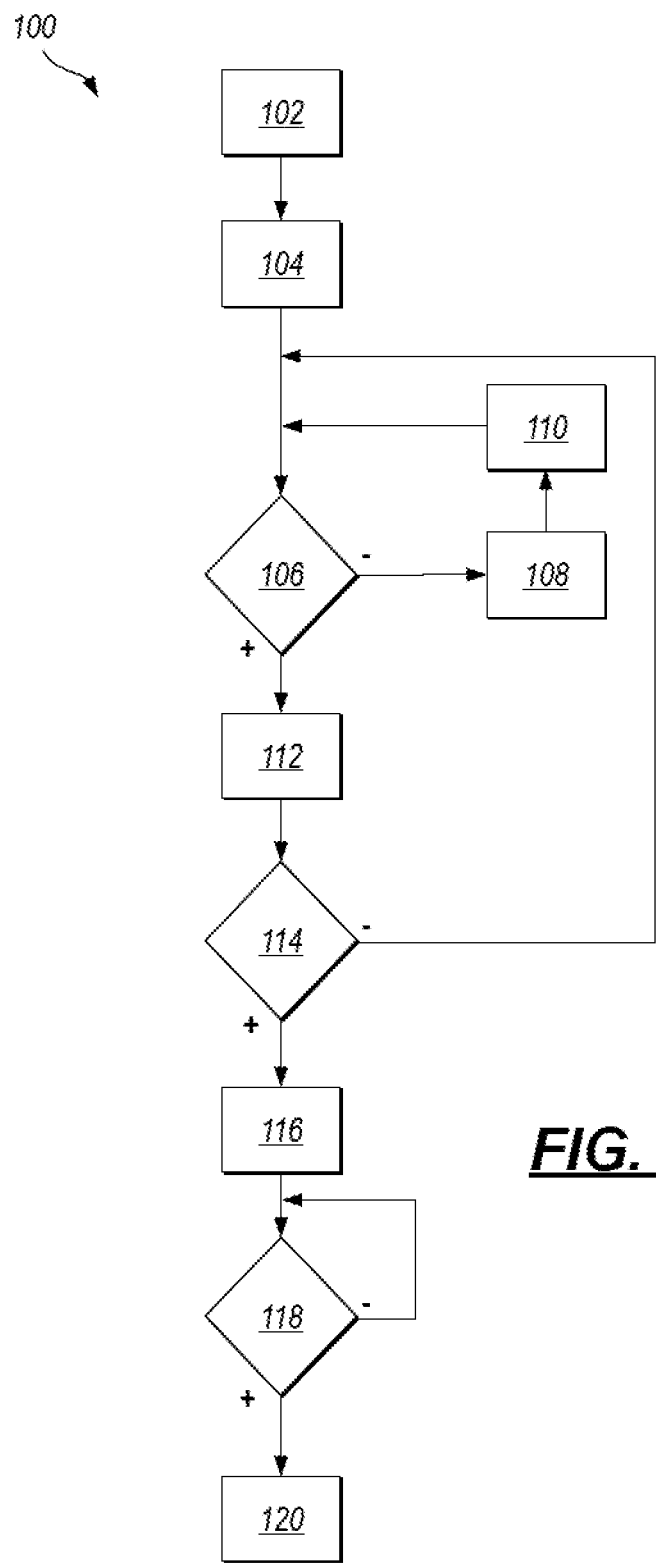
FIG. 2 is a schematic flow diagram of a method for controlling a hybrid diesel-electric powertrain during a regeneration event.

FIG. 2 schematically illustrates a method 100 for controlling a hybrid diesel-electric powertrain during a regeneration event. The method 100 begins at step 102 when the ECM 16 receives a request for a regeneration from the aftertreatment device 63. Such a request may be generated by the aftertreatment device 63, for example, when the difference in air-pressure across the particulate filter and/or lean NOx trap exceeds a threshold. Likewise, other factors/triggers may similarly be used to trigger a regeneration request for a NOx trap and/or a DPF aftertreatment system. These triggers may include, for example, NOx filtration models, engine run-time models, and/or outputs from other physical sensors. Upon receipt of the request from the aftertreatment device 63, in step 104 the ECM 16 may then make a request to the HCM 18 to determine if there is sufficient battery capacity to engage the electric motor 14 without over/undercharging the traction battery 32 during a potentially required immediate response. In step 106, the HCM 18 may poll the state-of-charge (SOC) for the traction battery 32 (i.e., where "state-of-charge" is a measure of the ability of the battery to supply and/or receive an electrical charge) and compare the SOC to a threshold. If the battery is too "full" (i.e., it is unable to receive much additional charge) or too empty (i.e., it is unable to supply motive power if a torque increase is requested) the HCM 18 may modify the engine/motor torque contribution optimization to place the SOC within a predetermined range of a target SOC (step 108), while queuing any outstanding regeneration request (step 110). In one configuration, the HCM 18 may affect the SOC by drawing-down power from the battery 32, such as by shifting a majority of the torque-producing duties to the electric motor 14. Alternatively, the HCM 18 may drive the motor 14 as a generator until the battery state-of-charge rises to within proper levels.

Once there is sufficient capacity (i.e., the SOC is within a predetermined range of a target SOC value, such that the battery 32 can both supply and receive electrical energy as required) the HCM 18 may grant permission to the ECM 16 to enter regeneration mode (step 112). Upon receiving the permission from the HCM 18, the ECM 16 may then determine if the powertrain is appropriately situated to enter regeneration mode (step 114). This determination may involve comparing the current and/or anticipated speed/torque requests to predetermined operating ranges to avoid initiating a regeneration during conditions where instantaneous torque requests are expected to frequently occur. If everything is within the required tolerances, in step 116, the ECM 16 may enter regeneration mode by increasing the fuel/air ratio until the engine is combusting a slightly rich fuel/air mixture (i.e., greater than a stoichiometric level). Alternatively, the ECM 16 may merely wait until the operating conditions improve.

Once the regeneration mode has been initiated, the HCM 18 may operate the electric motor 14 to meet all necessary immediate operating torque requests that it receives (step 120). The engine 12, however, may still maintain the ability to effectuate more gradual/steady-state torque changes through slower, air actuation-controlled torque response (e.g., boost pressure, EGR, and/or throttle control), despite the locked fuel/air ratio. In one configuration, the HCM 18 may shift the immediate torque response to the electric motor 14 by modifying cost factors associated within the motor/engine optimization model being continuously solved by the HCM 18.

In this manner, if the engine 12/ECM 16 switches into a regeneration mode and the TCM 50 requests an automatic gear change, due to the locked fuel/air ratio, the engine 12 would be unable to immediately effect a torque change without spooling delays. The immediate torque request may then be passed to the HCM 18, which may immediately operate the electric motor 14 as a generator to provide an instantaneous negative torque. This instantaneous negative torque may offset some or all of the engine output to effectuate a torque reduction at the transmission 20. Following the gear change, the HCM 18 may then blend the torque back to the engine 12 and/or may be configured to quickly generate torque if necessary (such as by converting power from the traction battery 32 into a motive force).

In step 118, the ECM 16 may determine if the aftertreatment device is sufficiently clean, such as by again examining the pressure difference across the filter 64. Once the ECM 16 has determined that the aftertreatment device is sufficiently clean, it may then exit the regeneration mode (step 118). The HCM 18 may then blend the primary torque control back to the ECM 16/diesel engine 12.

It may also be desirable for the engine 12 behavior to be constrained within in a predefined range of operating conditions throughout the regeneration event. For example, in one configuration, the ECM 16 may maintain the engine speed between 1000 to 2000 rpm and the engine steady state torque between 5 Nm to 100 Nm. These constraints may be integrated within the HCM 18 optimization such that the electric motor 14 may aid in providing any additional speed/power via the motor 14 as requested. Such constraints may also aid in balancing the SOC throughout the event.

While the above method 100 has been described, in part, using an automatic transmission shift event as an example, the method 100 may be equally suited for other instantaneous torque requesting events. Such events may include traction control requests, lash zone shaping requests, active damping requests, drag control requests, and/or engine overspeed protection requests. In each instance, an instantaneous torque actuation may be beneficial to control fast-acting dynamics of the vehicle.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of controlling a vehicle powertrain during an aftertreatment regeneration event, the powertrain including an electric motor in power-flow communication with a diesel engine, the method comprising:
   receiving a regeneration request;
   determining if a state-of-charge of a traction battery is within a predetermined range of a target value;

initiating the regeneration event if the state-of-charge of the traction battery is within the predetermined range of the target value;

receiving an immediate torque request from a transmission control module in response to a request for an automatic gear change, wherein the immediate torque request is a momentary negative torque request that is operative to decrease the torque transmitted through an automatic transmission to facilitate the automatic gear change; and operating the electric motor in response to the immediate torque request.

2. The method of claim 1, wherein initiating the regeneration event includes increasing the ratio of fuel-to-air provided to the diesel engine to a level greater than a stoichiometric balance.

3. The method of claim 1, wherein operating the electric motor in response to the immediate torque request includes operating the electric motor as a generator to produce a negative output torque.

4. The method of claim 1, further comprising drawing-down the state-of-charge of the traction battery if the state-of-charge is above the predetermined range.

5. The method of claim 1, further comprising regenerating the state-of-charge of the traction battery if the state-of-charge is below the predetermined range.

6. A hybrid diesel-electric powertrain comprising:
an electric motor in electrical communication with a traction battery;
a diesel engine in power-flow communication with the electric motor and with an automatic transmission, the diesel engine and electric motor configured to provide a combined torque to the automatic transmission;
an exhaust aftertreatment device in fluid communication with the diesel engine, the exhaust aftertreatment device including a lean NOx trap;
a controller in communication with the electric motor, the diesel engine, and the automatic transmission, the controller configured to:
receive a regeneration request from the exhaust aftertreatment device;
determine if a state-of-charge of the traction battery is within a predetermined range of a target value;
initiate a regeneration event if the state-of-charge of the traction battery is within the predetermined range of the target value;
receive an immediate torque request from the automatic transmission in response to a request for an automatic gear change, wherein the immediate torque request is a momentary negative torque request that is operative to decrease the torque transmitted through the automatic transmission to facilitate the automatic gear change; and
provide a torque command to the electric motor in response to the immediate torque request.

7. The hybrid diesel-electric powertrain of claim 6, wherein the controller is configured to initiate the regeneration event by increasing a ratio of fuel-to-air provided to the diesel engine to a level greater than a stoichiometric balance.

8. The hybrid diesel-electric powertrain of claim 6, wherein the torque command provided to the electric motor is configured to operate the electric motor as a generator to produce a negative output torque from the motor.

9. The hybrid diesel-electric powertrain of claim 6, wherein the controller is configured to draw down the state-of-charge of the traction battery if the state-of-charge is above the predetermined range.

10. The hybrid diesel-electric powertrain of claim 6, wherein the controller is configured to regenerate the state-of-charge of the traction battery if the state-of-charge is below the predetermined range.

11. The hybrid diesel-electric powertrain of claim 6, wherein the exhaust aftertreatment device is configured to provide a regeneration request when the pressure drop across the aftertreatment device exceeds a threshold pressure drop.

12. The hybrid diesel-electric powertrain of claim 6, wherein the immediate torque request includes a request for an immediate change in combined torque; and
wherein the electric motor supplies substantially all of the immediate change in combined torque in response to the immediate torque response during the regeneration event.

13. A hybrid diesel-electric powertrain comprising:
an electric motor in electrical communication with a traction battery;
a diesel engine in power-flow communication with the electric motor and with an automatic transmission, the diesel engine and electric motor configured to provide a combined torque to the automatic transmission;
an exhaust aftertreatment device in fluid communication with the diesel engine, the exhaust aftertreatment device including a lean NOx trap;
a controller in communication with the electric motor, the diesel engine, and an the automatic transmission, the controller configured to:
receive a regeneration request from the exhaust aftertreatment device;
determine if a state-of-charge of the traction battery is within a predetermined range of a target value;
initiate a regeneration event if the state-of-charge of the traction battery is within the predetermined range of the target value;
receive an immediate torque request from the automatic transmission in response to a request for an automatic gear change, the immediate torque request including a request for the combined torque to momentarily approach zero to facilitate the gear change; and
provide a negative torque command to the electric motor in response to the immediate torque request.

14. The hybrid diesel-electric powertrain of claim 13, wherein the negative torque command provided to the electric motor is configured to operate the electric motor as a generator to produce a negative output torque from the motor.

15. The hybrid diesel-electric powertrain of claim 13, wherein the controller is configured to draw down the state-of-charge of the traction battery if the state-of-charge is above the predetermined range.

16. The hybrid diesel-electric powertrain of claim 13, wherein the controller is configured to regenerate the state-of-charge of the traction battery if the state-of-charge is below the predetermined range.

17. The hybrid diesel-electric powertrain of claim 13, wherein the exhaust aftertreatment device is configured to provide a regeneration request when the pressure drop across the aftertreatment device exceeds a threshold pressure drop.

18. The hybrid diesel-electric powertrain of claim 6, wherein the immediate torque request includes a request for an immediate change in combined torque; and
wherein the electric motor supplies substantially all of the immediate change in combined torque in response to the immediate torque response during the regeneration event.

* * * * *